June 23, 1931. R. H. HUMMERT 1,811,502
SPOTLAMP FOR VEHICLES
Filed Sept. 7, 1929
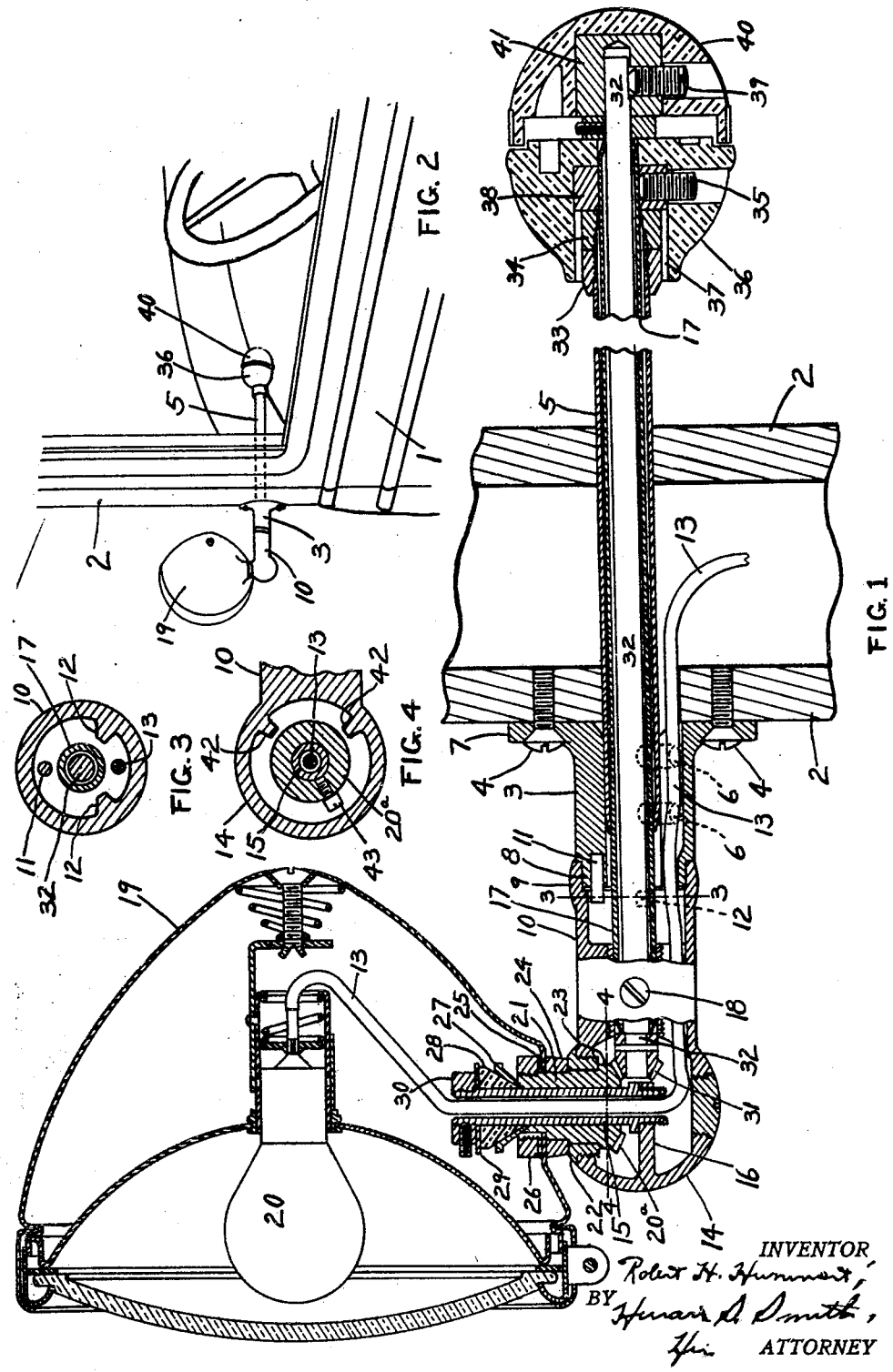
INVENTOR
Robert H. Hummert,
BY Henian A. Smith,
ATTORNEY Patented June 23, 1931

1,811,502

UNITED STATES PATENT OFFICE

ROBERT H. HUMMERT, OF DAYTON, OHIO, ASSIGNOR TO THE S. H. THOMSON MANUFACTURING COMPANY, OF DAYTON, OHIO, A CORPORATION OF OHIO

SPOTLAMP FOR VEHICLES

Application filed September 7, 1929. Serial No. 391,038.

This invention relates to new and useful improvements in spot lamps for vehicles.

It is one of the principal objects of my invention to provide a simple, compact and attractive spot lamp for automobiles, or airplanes. It may also be conveniently operated to turn the lamp to a desired position for brilliantly illuminating the roadway in front, at the side or in the rear of the car, or plane.

It is another object of my invention to provide a floating gear for connection to the lamp housing to permit the latter to be silently and efficiently rotated by the horizontal operating shaft. This gear also facilitates the adjustment with it of the pinion on the operating shaft, to obviate back lash.

It is another object of my invention to provide a self-alining sleeve bracket which is constructed to fit the contour of the respective vehicle part to which it is applied, thereby eliminating special drilling fixtures, to simplify and reduce the time of its installation. In other spot lamps it is first necessary to drill the hole in the supporting member and then fit the bracket to it.

It is another object of my invention to provide channels in the sleeve bracket and lamp housing to receive and completely enclose the lamp wire.

Another object of my invention is to provide an adjustable stuffing box for tensioning the movement of the lamp body around the vertical post.

Other important and incidental objects will be brought out in the following specification and particularly set forth in the subjoined claims.

In the accompanying drawings illustrating my invention, Figure 1 is a longitudinal sectional view taken through my improved spot lamp for vehicles. Figure 2 is a perspective view from the rear, of my spot lamp applied to a corner post of an automobile. Figure 3 is a cross sectional view taken through the gear casing on the line 3—3 of Figure 1. And Figure 4 is a cross sectional view taken through the gear casing on the line 4—4 of Figure 1.

Referring to the accompanying drawings for a detailed description of my invention, the numeral 1 designates an automobile to a front corner post 2 of which a sleeve bracket 3 is attached by screws 4, 4, although it may be secured to other parts of the car. The bracket 3 comprises a cylindrical casting formed with an axial hole to tightly receive an outside tube 5 which is fixedly secured to said bracket by set screws 6, 6.

At its rear end, the casting 3 terminates in a flange 7 which is formed to fit the contour of the part of the car to which it is attached by the set screws 4, 4. At its front end the casting 3 is formed with a reduced annular portion 8 to receive the flanged annular end 9 of a gear housing 10. A pin 11 projecting into the latter from the casting 3, is free to turn between two radial stops 12, 12 projecting inwardly from the inner surface of the said gear housing.

The axial shaft receiving hole in the casting 3 is continued below its round portion in the form of a channel to receive a light wire 13 which also projects through a hole in the corner post 2.

The gear housing 10 comprises a hollow cylindrical casting which is free to turn on the bracket 3 as a bearing, and which terminates at its front end in a ball portion 14 having a flat top containing a tapped hole through which a hollow vertical post 15 projects. The lower end of the post is threaded so that it can be screwed into a tapped hole in the center of a web 16 cast in the front part of the ball end of the gear casting 10.

The gear casting 10 contains an axial hole to tightly receive a hollow operative shaft 17 and to which it is fixedly secured by a screw 18. The shaft 17 is rotatable within the fixed tube 5 to turn the gear casting 10 which carries a lamp housing 19.

The lamp housing or shell 19 is preferably of the shape shown in the drawings, supporting within it in a more or less conventional manner an electric incandescent lamp 20 to which the lamp wire 13 leads.

Surrounding the post 15 above the web 16 is a bevel gear 20$^a$ having an upwardly projecting stepped sleeve portion 21 which is threaded at its upper end. Screwed into the tapped hole in the top of the ball part 14 of the gear housing 10 is a housing cap nut 22 which, through its engagement with the lower shoulder 23 on the gear 20ª, prevents the latter from coming out.

Resting upon the cap nut 22 is a spacer ring 24 upon which the flat bottom portion of the lamp housing 19 rests. Upon the top surface of the bottom portion of the lamp housing is a washer 25 against which bears a nut 26 screwed upon the upper threaded end of the sleeve portion 21 of the gear 20ª to firmly secure the lamp housing to the gear.

Inserted in the top of the nut 26 is a funnel shaped stuffing box 27 which receives a conical friction washer 28 upon which rests a metal washer 29. A nut 30 screwed on the threaded top end of the post 15 resiliently presses the stuffing box 27 into the washer 28 to place the gear 20ª under vertical spring tension on the post 15. Therefore, when a beveled pinion 31 fixed to the outer end of an operating shaft 32 is meshed with the floating gear 20ª, the nut 30 is free to be screwed down on the post to place the gear under sufficient tension for a proper mesh with the pinion 31 at all times.

The rear end of the tube 5 is tapered and externally threaded to receive first a lock nut 33 and then an adjusting nut 34 to provide a double reinforcing bearing for the shaft 17. When the adjusting nut 34 is drawn against the tube 5, it presses the taper the desired degree against the tube irrespective of any imperfections in it. The nut 34 is held in its adjusted position by the lock nut 33.

To the outer end of the hollow shaft 17 there is secured by a screw 35 a semi-spherical handle portion 36. This handle portion 36, which is preferably made of bakelite, has a central recess 37 in which there is molded a brass insert 38 through a hole in which the attaching screw 35 projects to engage the shaft 17 for the purpose of turning it when the handle portion 36 is rotated. The turning of this shaft 17 will move the gear housing 10 around the bracket sleeve 3 a sufficient distance to bring the lamp housing 19 to a desired vertical position.

When it is desired to rotate the lamp 10 around the post 15 as a vertical axis, the shaft 32 carrying the pinion 31 meshing with the gear 20ª, has been provided. This shaft 32 is free to rotate in, and passes through, the hollow shaft 17. Secured to the outer end of the shaft 32 by a screw 39 is a semi-spherical handle portion 40. This handle portion 40, which is preferably made of bakelite, is complemental to the handle portion 36 to form with the latter an attractive spherical knob. The handle portion 40 also has a central recess in which there is molded a brass insert 41 through a hole in which the attaching screw 39 projects to engage the shaft 32. By turning the handle portion 40, the spot lamp 19 may be rotated horizontally to a desired position about the post 10 irrespective of the position of the handle portion 36.

A control stop provided by two extending lugs 42, 42 on the inside surface of the ball portion 14 of the gear housing 10, limits the movement of the gear 20ª in each direction through contact of a screw 43 on the gear with one or the other of said lugs. Thus, when the control knob portion 40 is turned, the horizontal movement of the lamp housing 19 about the post 10 will be limited by the stop mechanism on the gear. In other words, a positive control for the light is controlled through the gear.

From the above description it will be seen that my improved spot lamp may not only be conveniently operated by the driver of the automobile, but that the floating gear 20ª has a proper engagement with the pinion 31 at all times and that the bracket sleeve 3 blends with, and forms a rigid bearing for, the gear housing 10 which carries the spot lamp assembly.

Having described my invention, I claim:

1. In a device of the type described, a horizontal support attachable to a vehicle, a gear housing free to turn vertically on said support, a hollow shaft passing through said support and connected to the gear housing to turn it, said housing having a hole in its top portion, a post projecting upwardly through said hole, a shaft passing through the hollow shaft, a pinion on the second shaft, a floating gear surrounding said post for engagement with said pinion, and a lamp housing secured to the floating gear.

2. In a device of the type described, a horizontal support attachable to a vehicle, a gear housing free to turn vertically on said support, a hollow shaft passing through said support and connected to the gear housing to turn it, said housing having a hole in its top portion, a post projecting upwardly through said hole, a shaft passing through the hollow shaft, a pinion on the second shaft, a gear on said post for engagement with said pinion, a lamp housing secured to said gear, an adjustable resilient member on the upper end of said post, and downwardly movable resilient means adapted to be engaged by the adjustable member to tension the engagement of said gear with the pinion.

3. In a device of the type described, a horizontal support attachable to a vehicle, a gear housing free to turn vertically on said support, a hollow shaft passing through said support and connected to the gear housing to turn it, said housing having a hole in its top portion, a post projecting upwardly through said hole, a shaft passing through the hollow shaft, a pinion on the second shaft, a gear on said post for engagement with said pinion, a lamp housing, annular means on the gear for securing the lamp housing to it, a funnel shaped stuffing box on the upper end of the post for engagement with the lamp securing means, a conical fiber washer also on the post for engagement with the stuffing box, the upper end of said post being threaded, and a nut on the threaded end of the post to exert a downward pressure against said washer for the purpose specified.

4. In a device of the type described, a horizontal support attachable to a vehicle, a gear housing free to turn vertically on said support, a hollow shaft passing through said support and connected to the gear housing to turn it, said housing having a hole in its top portion, a web in said housing, a post projecting upwardly from said web, a shaft projecting through the hollow shaft, a pinion on the second shaft, a gear on said post for engagement with said pinion, a threaded sleeve projecting upwardly from said gear, a lamp housing having a bottom part fitted over the sleeve portion of said gear, a nut on the threaded sleeve portion of the gear to exert a downward pressure against the bottom of the lamp housing, a funnel shaped stuffing box on the post for entrance into said nut, a conical fiber washer for engagement with the stuffing box, and a nut on the upper threaded end of said post to exert a downward pressure on the fiber washer for the purpose specified.

5. In a device of the type described, a horizontal support attachable to a vehicle, a gear housing free to turn vertically on said support, said housing having a hole in its top portion, a post projecting upwardly through said hole, a horizontal operating shaft passing into the gear housing through the support, a pinion on said shaft, a gear on the post in mesh with the pinion, a lamp housing secured to the gear, a projection on the gear, and two spaced lugs on the inner surface of the gear housing for contact by the projection on the gear to limit the movement of the gear, and through it the horizontal movement of the lamp housing, in either direction.

In witness whereof I have hereunto set my hand this 6th day of September, 1929.

ROBERT H. HUMMERT.